(12) United States Patent
Czichowski et al.

(10) Patent No.: US 10,197,044 B2
(45) Date of Patent: Feb. 5, 2019

(54) AUTOMATIC LUBRICATION SYSTEM FOR A BEARING, AND METHOD FOR OPERATING AN AUTOMATIC LUBRICATION SYSTEM

(71) Applicant: Aktiebolaget SKF, Gothenburg OT (SE)

(72) Inventors: Dino Czichowski, Schifferstadt (DE); Johannes Cornelis Theodorus Blom, Achterveld (NL); Harry Timmerman, Amsterdam (NL); Henricus van Genuchten, Utrecht (NL)

(73) Assignee: Aktiebolaget SKF, Göteborg (SE)

( * ) Notice: Subject to any disclaimer, the term of this patent is extended or adjusted under 35 U.S.C. 154(b) by 45 days.

(21) Appl. No.: 15/233,330

(22) Filed: Aug. 10, 2016

(65) Prior Publication Data

US 2017/0045040 A1 Feb. 16, 2017

(30) Foreign Application Priority Data

Aug. 11, 2015 (DE) .................. 10 2015 215 302

(51) Int. Cl.
*F03D 80/70* (2016.01)
*F16N 29/02* (2006.01)
*F16N 7/38* (2006.01)

(52) U.S. Cl.
CPC .......... *F03D 80/70* (2016.05); *F05B 2220/30* (2013.01); *F05B 2260/98* (2013.01); *F16C 2360/31* (2013.01); *F16N 7/385* (2013.01); *F16N 29/02* (2013.01); *F16N 2210/025* (2013.01); *F16N 2250/16* (2013.01); *F16N 2270/70* (2013.01); *Y02E 10/72* (2013.01)

(58) Field of Classification Search
CPC .......... F03D 80/70; F16N 29/02; F16N 13/00; F16N 13/06; F16N 19/00; F16N 21/00
See application file for complete search history.

(56) References Cited

U.S. PATENT DOCUMENTS

| | | | | |
|---|---|---|---|---|
| 4,738,336 A * | 4/1988 | Smith | ..................... | F16N 29/02 184/108 |
| 5,080,195 A * | 1/1992 | Mizumoto | .......... | F16C 33/6622 184/104.1 |
| 5,711,615 A * | 1/1998 | Stitz | ...................... | F16C 27/045 384/471 |

(Continued)

FOREIGN PATENT DOCUMENTS

| | | |
|---|---|---|
| DE | 69433065 T2 | 6/2004 |
| DE | 10327344 A1 | 1/2005 |

(Continued)

*Primary Examiner* — Michael A Riegelman
(74) *Attorney, Agent, or Firm* — Bryan Peckjian; SKF USA Inc. Patent Dept.

(57) ABSTRACT

An automatic lubrication system for automatic and demand-driven charging of a bearing with a lubricant includes an automatic lubrication device configured to automatically charge the bearing with the lubricant, a detecting device configured to detect at least one operating parameter of the bearing, and a data-transmission device that is configured to transmit data from the detecting device to the lubrication device. The automatic lubrication device is configured to charge the bearing with the lubricant based on the operating parameters detected by the detecting device.

10 Claims, 5 Drawing Sheets

(56) References Cited

U.S. PATENT DOCUMENTS

| | | | | |
|---|---|---|---|---|
| 6,189,656 B1* | 2/2001 | Morgenstern | ............ | F16N 7/38 184/108 |
| 6,324,899 B1* | 12/2001 | Discenzo | ............... | F16C 19/52 340/631 |
| 9,551,460 B2* | 1/2017 | Conley | ................... | F16N 29/02 |
| 2002/0105429 A1* | 8/2002 | Donner | ................... | B61K 9/04 340/682 |
| 2003/0110860 A1* | 6/2003 | Okada | .................... | B60B 27/00 73/593 |
| 2003/0115977 A1* | 6/2003 | Holweg | ................. | F16C 19/52 73/865.9 |
| 2004/0197040 A1* | 10/2004 | Walker | ................... | F16C 19/52 384/462 |
| 2009/0129714 A1* | 5/2009 | Shimomura | ........... | F16C 19/26 384/475 |
| 2010/0157304 A1* | 6/2010 | Takahashi | ............... | F16C 19/52 356/442 |
| 2013/0169093 A1* | 7/2013 | Begg | ........................ | H02K 7/08 310/90 |
| 2013/0284539 A1* | 10/2013 | Kobayashi | ......... | F16C 33/6622 184/7.4 |
| 2014/0324236 A1* | 10/2014 | Bankestrom | ........ | G01M 13/045 700/287 |
| 2015/0068844 A1* | 3/2015 | Strandell | ................ | F16N 29/00 184/6.1 |
| 2015/0252944 A1* | 9/2015 | Kreutzkaemper | .. | F16C 33/6625 184/6.1 |
| 2015/0292675 A1* | 10/2015 | Schjott | ................... | F16N 29/00 184/6.4 |
| 2015/0300319 A1* | 10/2015 | Pedersen | ................ | F03D 7/026 416/1 |
| 2016/0186812 A1* | 6/2016 | Conley | ................... | F16N 29/02 184/6.1 |
| 2016/0208983 A1* | 7/2016 | Moilanen | ................ | F16N 13/06 |
| 2017/0045040 A1* | 2/2017 | Czichowski | ........... | F03D 80/70 |

FOREIGN PATENT DOCUMENTS

| | | |
|---|---|---|
| DE | 102005057610 A1 | 6/2007 |
| DE | 102010003338 A1 | 9/2011 |
| DE | 102010020759 A1 | 11/2011 |
| DE | 102014204062 A1 | 9/2015 |

* cited by examiner

“AUTOMATIC LUBRICATION SYSTEM FOR A BEARING, AND METHOD FOR OPERATING AN AUTOMATIC LUBRICATION SYSTEM”

CROSS-REFERENCE

This application claims priority to German patent application no. 10 2015 215 302.9 filed on Aug. 11, 2015, the contents of which are fully incorporated herein by reference.

TECHNOLOGICAL FIELD

The present disclosure is directed to an automatic lubrication system for automatic and demand-driven charging of a bearing with lubricant, including an automatic lubrication device for automatically charging the bearing with lubricant and a detecting device for detecting operating parameters of the bearing. The disclosure further relates to a method for operating an automatic lubrication system for lubricating a bearing.

BACKGROUND

To reduce an internal resistance of a bearing, which internal resistance is caused, for example, by static or sliding friction, lubricant, such as, for example, bearing oils or greases are used. In rolling-element bearings wherein a first bearing part is movable relative to a second bearing part via rolling elements, the lubricant is needed, for reducing the inner resistance, in particular in the region of the rolling elements as well as at raceways for the rolling elements. So that the lubricants do not escape from the rolling-element bearing, in particular during operation, appropriate seals are provided on rolling-element bearings.

The service life of lubricants is often limited and can be dependent on, among other things, operating parameters of the rolling-element bearing, such as, for example, operating temperature, rotational speed, and bearing pressure, as well as ambient media, such as gases (for example, oxygen), solids (for example, salts), or liquids (for example, water). Furthermore, despite a sealing of the bearing, lubricant sometimes escapes from the bearing. Therefore the lubrication effect of a lubricant of a bearing decreases with increasing operating time of the bearing. As a result the inner resistance or the inner friction of the bearing, and thus the wear of the bearing, increases. Accordingly, to avoid excessive wear of the bearing and to ensure a lowest possible internal resistance of the bearing, care should be taken to avoid operating the bearing with insufficient or inadequate lubricant.

In order to ensure that the bearing is supplied with sufficient lubricant, many bearings include connectors for lubricant pumps, such as, for example, lubrication nipples. Via such nipples fresh lubricant is pressable into the interior of the bearing, for example, via a lubricant pump. It can be provided that old or used lubricant whose tribological properties are compromised, for example, by the intake of abrasion particles, is thereby displaceable out of the bearing.

In particular with large bearings that are subjected to a high mechanical load, a sufficient supplying of lubricant is particularly important since such bearings are often components of a large system, such as, for example, a wind turbine, and a failure of such a bearing results in high costs. Thus, for example, the failure of a wind turbine causes costs to the user for the duration of the failure since the wind turbine produces no current. Furthermore, repairing or replacing such a bearing is expensive since the components of such a wind turbine may sometimes weigh many tons. A disassembling and subsequent assembling of the bearing is therefore only possible by using special devices and is therefore very cost-intensive. For this reason an undersupplying of lubricant is to be avoided with bearings of this type.

For ensuring a regular supplying of the bearing with lubricant, automatic lubrication devices are known that supply the bearing with lubricant according to a prescribed maintenance plan or schedule. Disadvantageously, such lubrication devices do not recognize the actual lubricant need, and lubricants are only provided by them based on experience values or calculations. Particular operating conditions, such as, for example, lubricant leakages, contamination of the lubricant, e.g., due to abrasion of bearing components, increased need of lubricant due to particular load states of the bearing or gumming of the lubricant, are not taken into account by these lubrication devices. Accordingly an undersupplying of the bearing with lubricant, for example, can result with such lubricant devices, due to which undersupplying the wear of the bearing is increased. In the worst case this can lead to damage to the bearing. A too high forecast of the lubricant requirement of the bearing, on the other hand, can also result in an oversupplying of the bearing with lubricant. Such a state is also disadvantageous since the operability of the bearing is thereby possibly reduced.

SUMMARY

An aspect of the present disclosure is therefore to provide an automatic lubrication system for automatically supplying a bearing with lubricant, which lubricant system at least partially does not have the above disadvantages. In particular it is an aspect of the present disclosure to provide an automatic lubrication system for automatic and demand-driven charging of a bearing with lubricant, which system at least substantially ensures a supplying of the bearing with lubricant depending on an actual lubricant requirement of the bearing.

Accordingly an aspect of the present disclosure comprises an automatic lubrication system for automatic and demand-driven charging of a bearing with lubricant, which automatic lubrication system includes an automatic lubrication device for automatically charging the bearing with lubricant and a detecting device for detecting operating parameters of the bearing. The lubrication system includes a data transmission device that is configured to transmit data between the detecting device and the lubrication device. The automatic lubrication device is further configured to charge the bearing with lubricant based on the operating parameters detected by the detecting device.

An automatic lubrication device includes, for example, a lubricant pump, a lubricant tank, a lubricant line, and a control unit. The control unit, which may include a microprocessor, is configured to control the lubricant pump such that it pumps lubricant from the lubricant tank through the lubricant line into the bearing.

The detecting device includes at least one sensor that is designed for detecting at least one operating parameter of the bearing. Operating parameters of the bearing are, for example, bearing rotational speed, bearing temperature, bearing vibration, or bearing pressure. Accordingly the operating parameters are detectable during operation of the bearing and may depend on the type of operation of the bearing. For example, bearing vibrations are dependent on the rotational speed of the bearing as well as on the amount of lubricant present in the bearing. Preferably the detecting device includes one or more sensors for detecting a plurality of operating parameters of the bearing. Furthermore, the detecting device is configured to provide data based on the detected operating parameters of the data transmission device. These data can be, for example, raw data of the detected operating parameters, evaluated operating-parameter data, or control signals for the lubricant device for supplying the bearing with lubricant.

The data transmission device is configured for transmitting the data detected by the detecting device to the lubrication device. The data transmission device thus makes it possible to control the lubrication device based on the detected operating parameters of the bearing.

Information regarding a current supplying of the bearing with lubricant is determinable via the operating parameters of the bearing. For example, using lubricant characteristic maps, operating parameters can be used for analyzing the current lubricant state or requirement. The automatic lubrication system is preferably configured to evaluate operating parameters using a Fourier transformation. For example, the frequency spectrum of an acoustic sensor or of an acceleration or vibration sensor can provide information regarding whether there is predominant metallic contact in the bearing between rolling elements and raceways or whether such a contact is prevented by sufficient lubrication.

Compared to conventional lubrication systems for automatically charging a bearing with lubricant, such a lubrication system has the advantage that a charging of the bearing with lubricant no longer occurs exclusively at predetermined time intervals but rather can occur depending on an actual lubricant requirement of the bearing. Thus, for example, by evaluating the operating parameters of the bearing it can be determined that a critical lubricant state, such as, for example, an undersupplying of the bearing with lubricant, is imminent if a timely relubrication does not occur. To avoid such a critical lubricant state, an automatic relubrication of the bearing can thus be effected in a timely manner by the lubricant system. A further advantage is that less lubricant is wasted if the lubrication occurs in a demand-driven manner and not according to an established lubrication plan. Of course the lubrication system is suited to ensure the supplying of the bearing with lubricant both according to an established lubrication plan and in a demand-driven manner depending on the operating parameters of the bearing.

According to a preferred further development of the lubrication system the detecting device and the lubrication device are electrically isolated from each other. This is of advantage in particular with large systems, such as, for example, wind turbines, since, for example, due to different electric potentials or ground currents, lubrication devices and detecting devices can damage or interfere with each other. Such an influencing is prevented and thus the operational reliability of the lubrication system is increased by an electrical separation of detecting device and lubrication device.

The data transmission device is preferably configured for transmitting optical signals. For this purpose the data transmission device includes, for example, a transmitter for transmitting light waves and a receiver for receiving the light waves. For transmitting the light waves the data transmission device preferably includes a light guide, such as, for example, a glass fiber cable. Optical signals have the advantage that data are transmissible without there being an electrical connection between transmitter and receiver.

Further preferably the data transmission device includes a relay for transmission of electrical signals. Via a relay electrical signals of a primary current circuit are transmissible to a secondary current circuit without producing an electrical connection between the primary current circuit and the secondary current circuit here. The primary current circuit is preferably coupled to the detecting device and to the electromagnets of the relay. The secondary current circuit is preferably interruptibly or closably connected by the relay and to the lubrication device. By supplying a data pulse to the primary current circuit the relay is actuatable such that the data pulse is transmissible via the relay to the secondary current circuit. Thus a data transmission from the detecting device to the lubricating device is possible with simple means and in a cost-effective and reliable manner without electrical coupling of detecting device and lubricating device.

In one advantageous design of the lubrication system the data transmission device includes at least one radio transmitter and at least one radio receiver for transmitting radio signals. The radio transmitter is preferably coupled to the detecting device, and the radio receiver is coupled to the lubrication device. Data are thus transmissible from the detecting device to the lubrication device without an electrical coupling of detecting device and lubrication device being required. Such a data transmission device has the further advantage that data are transmissible from the detecting device and optionally from the lubrication device to a distant control unit. Operating states of the lubrication system can thus be easily and cost-effectively monitored.

The detecting device is preferably configured for the detection of accelerations and/or speeds. Detectable accelerations are, for example, vibrations, in particular vibrations that are caused by the bearing in its operation. Using suitable analysis methods, such as, for example, the Fourier transformation, statements about a lubricant state of the bearing are generatable from the detected accelerations. In particular, an evaluation of the spectrum of the received accelerations can allow reliable conclusions to be drawn about the tribological state of the bearing and optionally indicate the need to relubricate the bearing. A speed is, for example, a rotational speed of the bearing.

The detecting device is particularly preferably configured to detect accelerations and speeds. Dependencies of vibrations of the bearing on a load of the bearing can thereby also be considered. This has the advantage that it is also determinable which part of the vibrations of the bearing are to be ascribed to a lubricant state of the bearing and which part is to be ascribed to external influences, for example to the loads to which the bearing is being subjected. The accuracy and reliability of the lubrication system is thereby significantly improved. For example, in many applications, among others in wind turbines, the current load of the bearing can directly correspond to the current rotational speed of the bearing. This may mean, for example, that the same operating vibration may be detected both a) when the bearing is operating at a first rotational speed with sufficient lubricant and b) when the bearing is operating at a second, lower rotational speed, with insufficient lubricant.

The lubrication system is particularly preferably configured for lubricating a bearing of a wind turbine. Wind turbine bearings, in particular bearings of a rotor of such a wind turbine, are subject to high loads during operation and therefore require an optimal lubrication, which is ensured by the disclosed lubrication system. Furthermore, lubrication systems of such a bearing are also subject to particular loads such that lubrication systems wherein there is an electrical separation between detecting device and lubrication device are particularly suitable for such an application case.

In another aspect, an automatic lubrication system for automatic and demand-driven charging of a bearing with a lubricant includes a pump configured to automatically charge the bearing with the lubricant, a pump controller operably connected to the pump, a detector controller, an acceleration detector configured to detect operational vibrations of the bearing and to transmit a first signal indicative of the detected operational vibrations to the detector controller, and a rotational speed detector configured to detect a rotational speed of the bearing and to transmit a second signal indicative of the detected rotational speed to the detector controller. The detector controller is electrically isolated from the pump controller, and the detector controller is configured to send a signal to the pump controller to cause the pump to charge the bearing with the lubricant based on the first signal and the second signal. The detector controller is also configured to compare a level of the detected operational vibrations indicated by the first signal with a maximum level of operational vibrations for the rotational speed indicated by the second signal and to cause the pump to charge the bearing with the lubricant if the level of the detected operational vibrations indicated by the first signal exceeds the maximum level of operational vibrations.

Furthermore, an aspect of the disclosure comprises a method for operating an automatic lubrication system for lubricating a bearing. The method includes the following steps:

Detecting at least one operational vibration of a bearing;

Evaluating the detected operational vibration in order to determine whether the bearing has sufficient lubricant; and Automatically lubricating the bearing if the bearing does not have sufficient lubricant.

In operation the bearing generates operational vibrations. The operational vibrations are dependent on, among other things, a lubricant state. For example, an actual lubricant state of the bearing is determinable by comparing the operational vibrations with target values. Here particularly strong vibrations or high amplitudes of the operational vibrations indicate a lubricant state wherein a relubrication of the bearing is required, while operational vibrations with relatively low amplitudes indicate that sufficient lubricant is still available. In particular the frequency spectrum of the vibrations can also provide information regarding the tribological state of the bearing. If a relubrication is required a defined amount of lubricant is preferably supplied to the bearing. The defined amount is preferably dependent on the determined lubricant state so that when a particularly high lubricant need is determined a correspondingly high amount of lubricant for the bearing is indicated. Alternatively the defined amount of lubricant is predefined so that with each dispensing of lubricant the same amount is dispensed to the bearing.

The bearing is thus lubricated in an automatic and demand-driven manner if a lubricant state has been detected wherein a relubrication of the bearing is required. The method is preferably designed such that such a lubricant state is only determined if operational vibrations characteristic for the lubricant state have a predefined duration, e.g., one minute long, or frequency of occurrence, e.g., 2 to 10 times, in order to avoid a spontaneous lubricating due to, for example, a one-time severe operational vibration.

The automatic lubricating of the bearing particularly preferably occurs such that at least a predefined minimum time period falls between two lubrication processes. Such a time period is preferably between 1 and 250 hours, further preferably between 5 and 50 hours, and particularly preferably approximately 24 hours. This is advantageous because the lubricant supplied to the bearing only need be distributed in the bearing and during this time period ever-more-severe operational vibrations of the bearing can occur. It should thereby be prevented that an oversupplying of the bearing with lubricant occurs. This also has the advantage that less lubricant will be wasted.

The method is particularly preferably carried out on a disclosed lubricant system. A disclosed lubricant system is particularly suited for carrying out the method.

In one advantageous design of the method the evaluating of the detected operational vibration occurs depending on a rotational speed of the bearing. Operational vibrations, in particular the amplitude of operational vibrations of a bearing are dependent on the lubricant state and the rotational speed of the bearing. Taking into account the rotational-speed dependency of the measured operational vibrations the lubricant state can be determined still more precisely. The method is thereby further improved.

A bearing temperature and/or a bearing pressure is further taken into account with an evaluating of the detected operational vibration since the operational vibrations of the bearing can also have a dependency on these parameters.

The evaluating of the detected operational vibration preferably occurs using a fast Fourier transformation. It has been shown that an algorithm of this type is particularly suitable for evaluating the operational vibrations.

Features that are described in connection with the automatic lubrication system for automatic and demand-driven charging of a bearing with lubricant also apply in connection with the disclosed method for operating an automatic lubrication system for lubricating a bearing and vice versa so that reciprocal reference can be made to these features.

BRIEF DESCRIPTION OF THE DRAWINGS

In the following the disclosure shall be explained in more detail with reference to drawings.

DETAILED DESCRIPTION

Figure 1A:
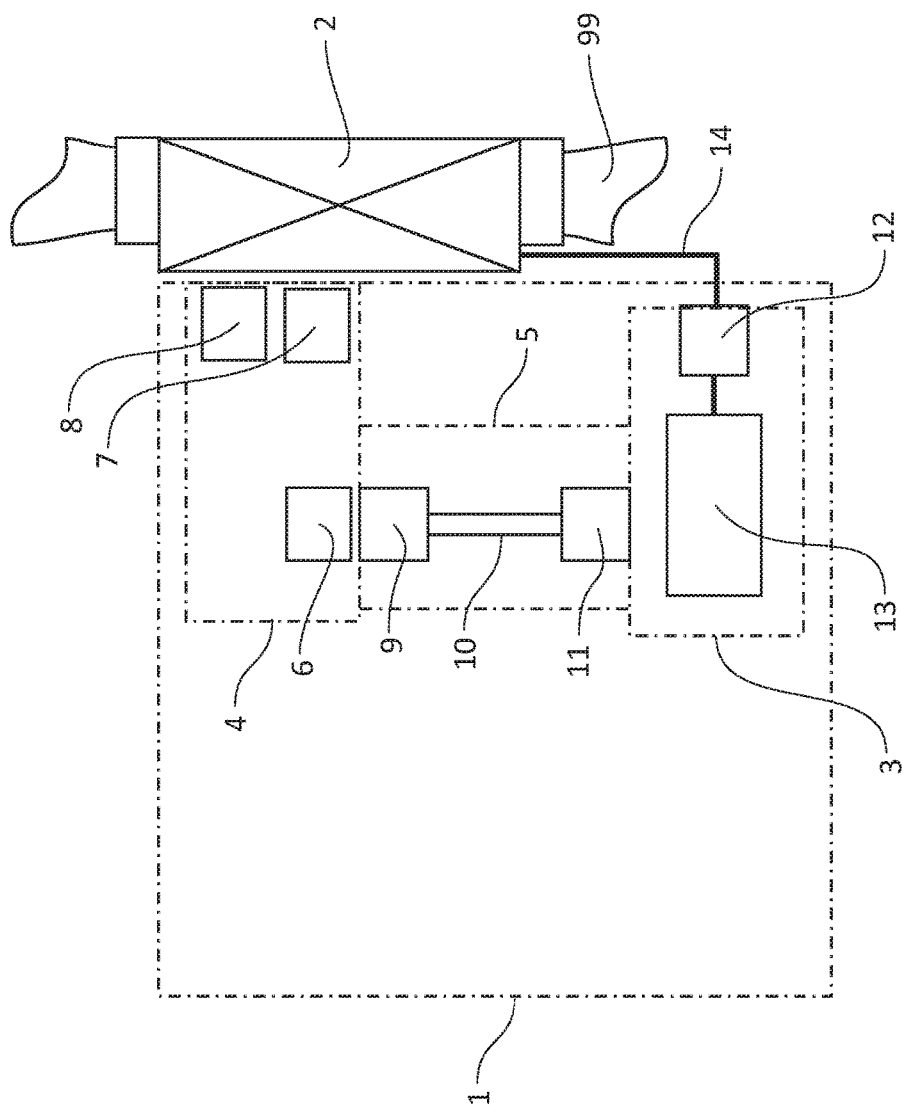
FIG. 1A schematically shows a first variant of an automatic lubrication system.

The first embodiment, schematically depicted in FIG. 1A, of the automatic lubrication system 1 for charging a bearing 2 with lubricant in an automatic and demand-driven manner includes a lubrication device 3. This device optionally includes a lubricant tank 13 and a lubricant pump 12. The lubrication device 3 is configured for supplying the bearing 2, which may be, for example, a rotor bearing of a wind turbine 99, with a lubricant, for example, lubricating grease. The lubrication system 1 includes a detecting device 4 for detecting operating states of the bearing 2. The detecting device 4 can optionally include, for example, an acceleration sensor 7 for detecting or measuring operational vibrations B (see FIG. 2) of the bearing 2. Furthermore the detecting device 4 can optionally include a rotational speed sensor 8 for detecting or measuring a bearing rotational speed of the bearing 2. The rotational speed sensor 8 is or may comprise, for example, an optical rotational speed sensor. The detecting device 4 can optionally include a controller or a control unit 6, which may comprise a microprocessor and be configured to receive and evaluate the operating parameters of the bearing 2, which operating parameters are detected by the acceleration sensor 7 and/or by the rotational speed sensor 8. The control unit 6 is further configured to generate a control signal, based on the evaluated operating parameters, for controlling the lubricant pump 12, switching the pump 12 on and off, for example. Using the control signal the lubricant pump 12 for pumping lubricant into the bearing is switchable-on, and switchable-off for interrupting the pumping of lubricant.

Figure 1B:
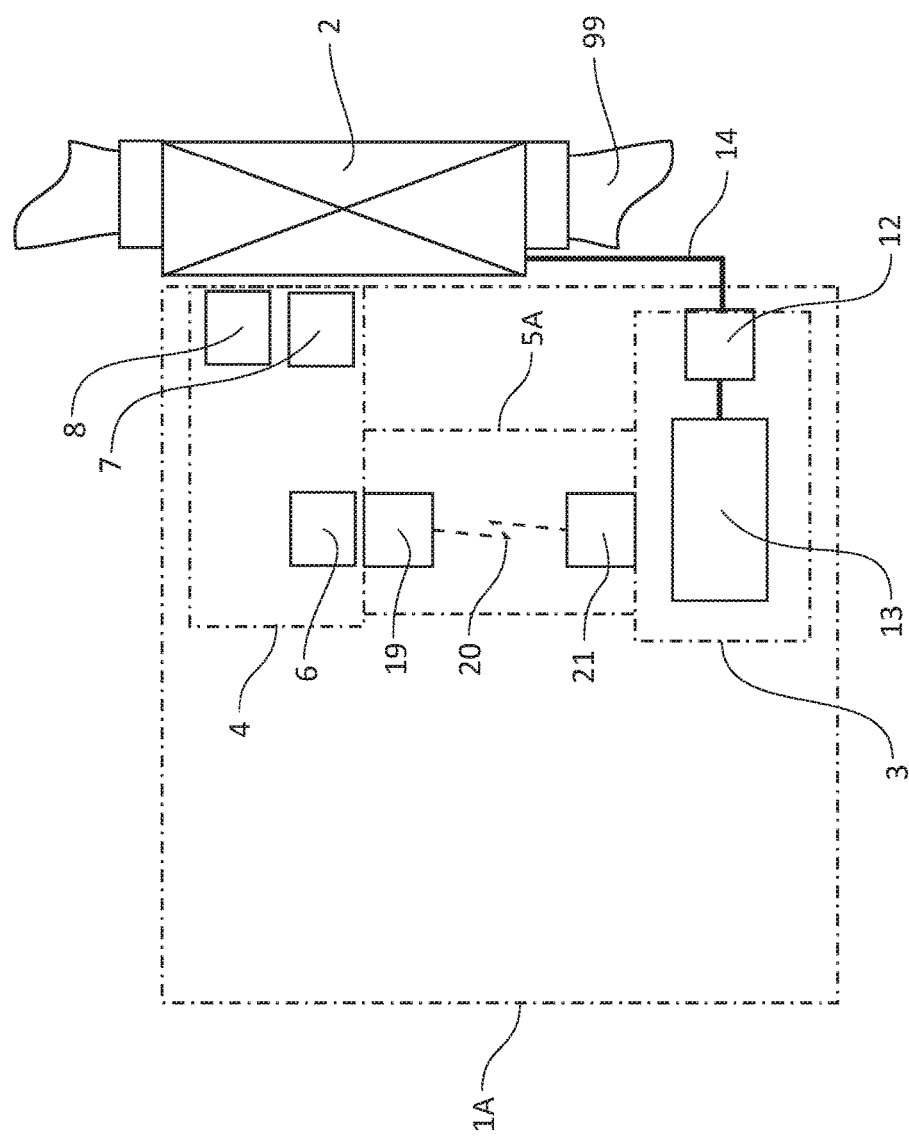
FIG. 1B schematically shows a second variant of the automatic lubrication system introduced in FIG. 1A.
Figure 1C:
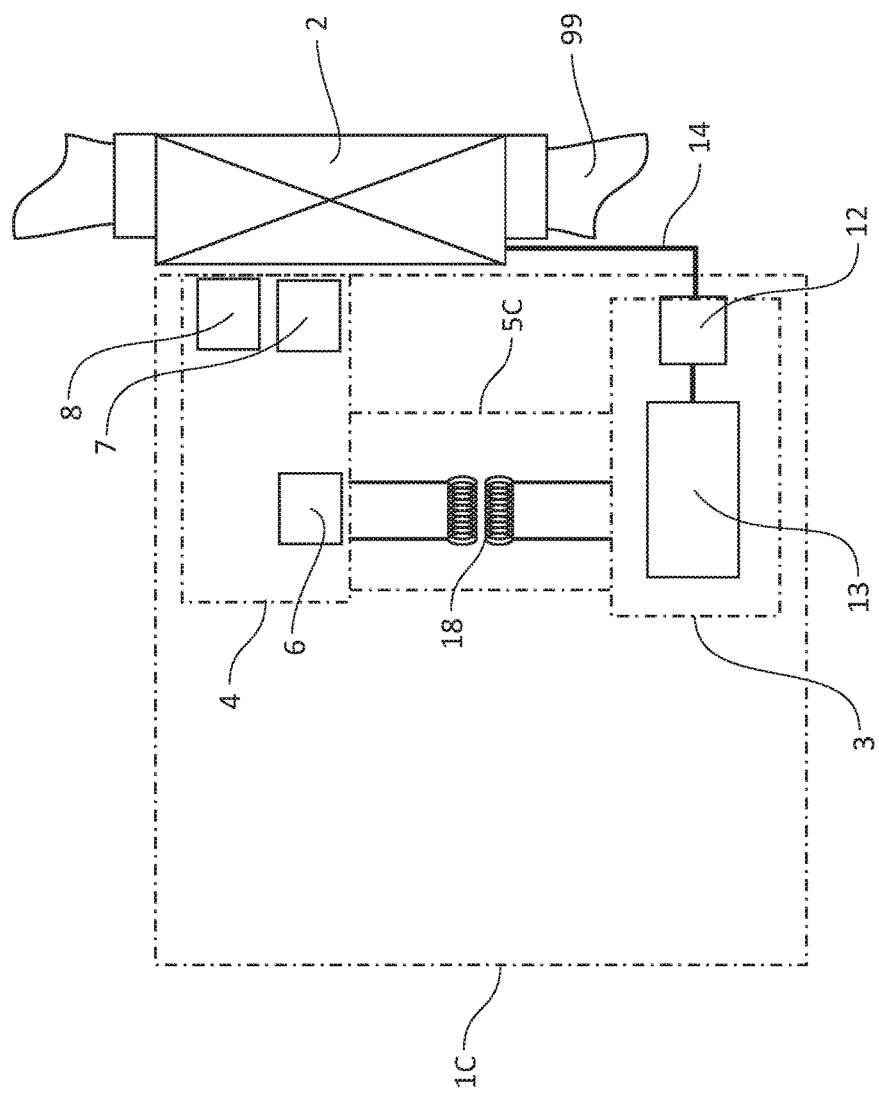
FIG. 1C schematically shows a third variant of the automatic lubrication system introduced in FIG. 1A.

The lubrication system 1 includes a data transmission device 5 for transmitting the control signal from the detection device 4 to the lubrication device 3. This can include, for example, an optical transmitter 9, an optical guide 10, and an optical receiver 11. The optical transmitter 9 is coupled to the detection device 4 and configured to send the control signal to the optical receiver 11 via the optical guide 10. The optical receiver 11 is coupled to the lubrication device 3 and configured to receive the control signal. The lubrication device 3 and the detection device 4 are thereby electrically separated from each other. In a second example of a lubrication system 1B, shown in FIG. 1B, a data transmission device 5B utilizes a radio frequency transmitter 19 is coupled to the detection device 4 and configured to wirelessly (an electrically separated communication link) send 20 the control signal to a radio frequency receiver 21. In a third example of a lubrication system 1C, shown in FIG. 1C, a data transmission device 5C utilizes a relay 18 to communicate, via an electrically separated communication link, the control signal from the control unit 6 to the lubrication device 3.

Figure 2:
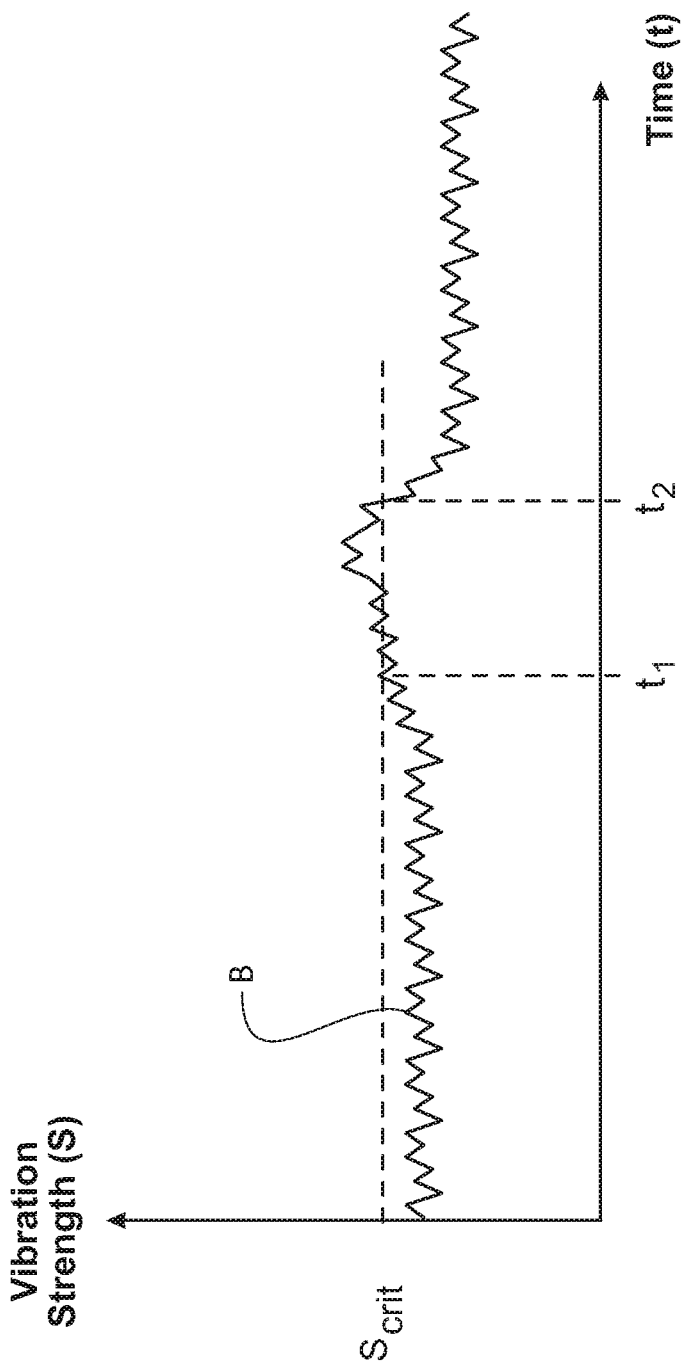
FIG. 2 schematically shows a diagram of a vibration strength of an operational vibration depending on time.

FIG. 2 shows, in a diagram, the vibration strength of an operational vibration B depending on the time in arbitrary units. This diagram is corrected for rotational speed so that a variation of the vibration strength of the operational vibration B, which variation is caused by a rotational speed of the bearing 2, is already compensated for in the depicted operational vibration B. Prior to a first point in time t1 the operational vibration B is in a normal range wherein the bearing 2 has sufficient lubricant. Starting from the point in time t1 the vibration strength of the operational vibration exceeds a critical vibration strength Scrit. As can be seen from this diagram the vibration strength of the operational vibration B also exceeds the critical vibration strength Scrit after the point in time t1. From this it can be concluded that there is a need for more lubricant, so the lubricant system 1 dispenses lubricant on the bearing 2. Starting from the point in time t2 the operational vibration B is again below the critical vibration strength Scrit. This reflects the effects due to the dispensing of the lubricant on the bearing 2 by the lubricant system 1.

Figure 3:
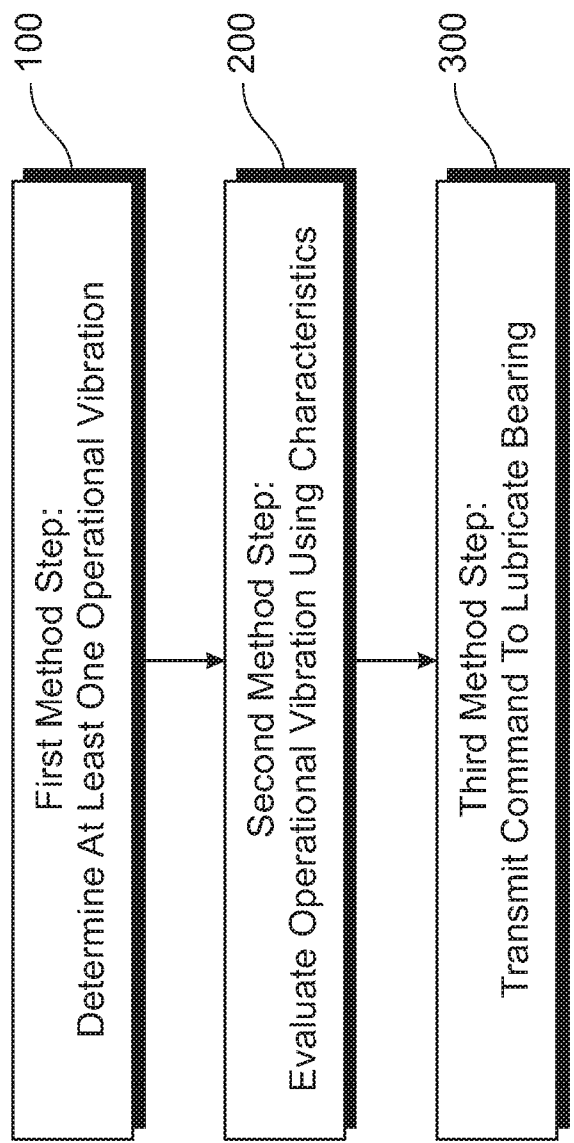
FIG. 3 schematically shows a flow diagram of the method for operating an automatic lubrication system for lubricating a bearing.

In FIG. 3 the method is depicted for operating an automatic lubrication system 1 for lubricating a bearing 2. In a first method step 100 at least one operational vibration B of the bearing 2 is determined using a vibration sensor 7 and a bearing rotational speed of the bearing 2 is determined using a rotational-speed sensor 8. In a second method step 200 the determined operational vibration B is evaluated using characteristics of the bearing 2 based on the determined bearing rotational speeds. It is thereby determined whether the bearing 2 has sufficient lubricant. In a third method step 300, if it is established that the bearing 2 does not have sufficient lubricant a control command is transmitted to a lubrication device 3 of the lubrication system 1 for controlling the lubrication device 3. The control command causes the lubrication device 3 to lubricate the bearing 2.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved automatic lubrication systems.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

Ref. No. Description
1, 1B, 1C Lubrication system
2 Bearing
3 Lubrication device
4 Detecting device
5, 5B, 5C Data transmission device
6 Control unit
7 Acceleration sensor
8 Rotational-speed sensor
9 Optical transmitter
10 Optical guide
11 Optical receiver
12 Lubricant pump
13 Lubricant tank
14 Lubricant line
18 Relay
19 Radio frequency transmitter
20 Wireless transmission
21 Radio frequency receiver
99 Wind turbine
100 First method step
200 Second method step
300 Third method step
B Operational vibration
$S_{crit}$ Critical vibration strength
$t_1$ First point in time
$t_2$ Second point in time

What is claimed is:

1. An automatic lubrication system for automatic and demand-driven charging of a bearing with a lubricant comprising:

an automatic lubrication device configured to automatically charge the bearing with the lubricant;

a detecting device configured to detect at least one operating parameter of the bearing, and a data-transmission device that is configured to transmit data from the detecting device to the lubrication device, wherein the data-transmission device, the detecting device, and the lubrication device are electrically isolated from one another, wherein the automatic lubrication device is configured to charge the bearing with the lubricant based on the operating parameters detected by the detecting device.

2. The automatic lubrication system according to claim 1, wherein the data-transmission device comprises one of an optical transmitter, a relay for transmitting electrical signals, or a radio frequency transmitter.

3. The automatic lubrication system according to claim 1, wherein the detecting device is at least one of an acceleration detector and a speed detector.

4. The automatic lubrication system according to claim 1, wherein the bearing is integrated into a wind turbine.

5. The automatic lubrication system according to claim 1, wherein the data-transmission device comprises one of an optical transmitter or a radio frequency transmitter, and wherein the detecting device comprises an acceleration detector and a speed detector.

6. The automatic lubrication system according to claim 1, wherein the automatic lubrication system includes a pump configured to pump the lubricant to the bearing and a pump controller configured to control the pump, wherein the detecting device comprise a detector controller, an acceleration detector configured to detect operational vibrations of the bearing and to transmit a first signal indicative of the detected operational vibrations to the detector controller, a rotational speed detector configured to detect a rotational speed of the bearing and to transmit a second signal indicative of the detected rotational speed to the detector controller, wherein the detector controller is electrically isolated from the pump controller, and wherein the detector controller is configured to compare a level of the detected operational vibrations indicated by the first signal with a maximum level of operational vibrations for the rotational speed indicated by the second signal and to send a signal to the pump to cause the pump controller to dispense the lubricant if the level of the detected operational vibrations indicated by the first signal exceeds the maximum level of operational vibrations.

7. The automatic lubrication system according to claim 6, wherein the detector controller is configured to compare a level of the detected operational vibrations indicated by the first signal with a maximum level of operational vibrations for the rotational speed indicated by the second signal and to cause the pump controller to cause the pump to charge the bearing with the lubricant if the level of the detected operational vibrations indicated by the first signal exceeds the maximum level of operational vibrations.

8. The automatic lubrication system according to claim 1, wherein the data-transmission device comprises an optical transmitter for transmitting signals in an electrically isolating manner.

9. The automatic lubrication system according to claim 8, wherein the detecting device is at least one of an acceleration detector and a speed detector.

10. An automatic lubrication system for automatic and demand-driven charging of a bearing with a lubricant comprising:

a pump configured to automatically charge the bearing with the lubricant;

a pump controller operably connected to the pump;

a detector controller;

an acceleration detector configured to detect operational vibrations of the bearing and to transmit a first signal indicative of the detected operational vibrations to the detector controller; and a rotational speed detector configured to detect a rotational speed of the bearing and to transmit a second signal indicative of the detected rotational speed to the detector controller;

wherein the detector controller is electrically isolated from the pump controller; and wherein the pump controller is configured to cause the pump to charge the bearing with the lubricant based on a signal from the detector controller.

* * * * *